US006934293B1

(12) United States Patent
DeJager et al.

(10) Patent No.: US 6,934,293 B1
(45) Date of Patent: Aug. 23, 2005

(54) PORT AGGREGATION LOAD BALANCING

(75) Inventors: Gregory L. DeJager, San Jose, CA (US); James R. Rivers, Saratoga, CA (US); David H. Yen, Palo Alto, CA (US); Stewart Findlater, Mountain View, CA (US); Scott A. Emery, Saratoga, CA (US)

(73) Assignee: Cisco Technology, Inc., San Jose, CA (US)

(*) Notice: Subject to any disclaimer, the term of this patent is extended or adjusted under 35 U.S.C. 154(b) by 7 days.

(21) Appl. No.: 10/683,222

(22) Filed: Oct. 10, 2003

Related U.S. Application Data

(63) Continuation of application No. 10/251,605, filed on Sep. 19, 2002, now Pat. No. 6,667,975, which is a continuation of application No. 09/204,658, filed on Dec. 2, 1998, now Pat. No. 6,473,424.

(51) Int. Cl.[7] .......................... H04L 12/56; H04L 12/66

(52) U.S. Cl. ....................... 370/401; 370/389; 370/412; 709/103

(58) Field of Search ................................. 370/216, 221, 370/389, 401, 412; 709/103, 105

(56) References Cited

U.S. PATENT DOCUMENTS

| | | | | |
|---|---|---|---|---|
| 5,414,704 A | | 5/1995 | Spinney | |
| 5,506,987 A | | 4/1996 | Abramson et al. | |
| 5,872,773 A | | 2/1999 | Katzela et al. | |
| 5,892,903 A | | 4/1999 | Klaus | |
| 5,950,205 A | | 9/1999 | Aviani, Jr. | |
| 5,953,335 A | | 9/1999 | Erimli et al. | |
| 5,959,968 A | * | 9/1999 | Chin et al. | 370/216 |
| 5,989,060 A | | 11/1999 | Coile et al. | |
| 6,006,266 A | | 12/1999 | Murphy et al. | |
| 6,016,388 A | | 1/2000 | Dillon | |
| 6,052,718 A | | 4/2000 | Gifford | |
| 6,345,294 B1 | | 2/2002 | O'Toole et al. | |
| 6,363,077 B1 | * | 3/2002 | Wong et al. | 370/422 |
| 6,473,424 B1 | | 10/2002 | De Jager et al. | |

FOREIGN PATENT DOCUMENTS

WO WO98/31107 7/1998

OTHER PUBLICATIONS

Akamai Technologies, Inc.—Global Internet Content Delivery—"How FreeFlow Works," webmaster@akamai.com 1999–2000.

Digital Island, Inc. –e–Business Without Limits–, "Enabling Technologies," http://www.digisle.net. No date.

Internap, "Preferred Collocation Services," http://www.internap.com Copyright © 2001 Internap Network Services Corporation.

Meyer, et al., Request For Comments No. 2026, entitled, "Generic Routing Encapsulation (GRE)," Jan., 2000, Internet Engineering Task Force, 9 pages.

(Continued)

*Primary Examiner*—Afsar Qureshi
(74) *Attorney, Agent, or Firm*—Beyer Weaver & Thomas LLP

(57) ABSTRACT

The network switches and computer readable mediums of the present invention allocate port assignments based on load, that is, the amount of data being forwarded through each port in the group. The load balancing of the present invention is preferably dynamic, that is, packets from a given stream may be forwarded on different ports depending upon each port's current utilization. When a new port is selected to transmit a particular packet stream, it is done so that the packets cannot be forwarded out of order. This is preferably accomplished by ensuring passage of a period of time sufficient to allow all packets of a given stream to be forwarded by a port before a different port is allocated to transmit packets of the same stream. The invention may be used in a variety of different network environments and speeds, including 10Base-T, 100Base-T, and Gigabit Ethernet, and other network environments.

13 Claims, 5 Drawing Sheets

OTHER PUBLICATIONS

Johnson et al., "Dynamic Server Organization," U.S. Appl. No. 09/294,837, filed Apr. 19, 1999, 42 Pages.

Lu et al., "Automatic Network Addresses Assignment and Translation Interference," U.S. Provisional Patent Application No.: 60/160,535, Filed Oct. 20, 1999, 127 Pages.

Lu et al., "Method and Apparatus for Automatic Network Address Assignment," U.S. Provisional Patent Application No.: 60/178,063, filed Jan. 24, 2000, 74 Pages.

Johnson et al., "Method and Apparatus for Determining a Network Topology in the Presence of Network Address Translation," U.S. Provisional Patent Application No.: 60/178,062, filed Jan. 24, 2000, 32 Pages.

Toole et al., "Fast–Changing Network Status and Load Monitoring and Feedback," U.S. Provisional Patent Application No.: 60/177,985 filed Jan. 25, 2000, 20 Pages.

Kirk Johnson, "A Method and Apparatus for Minimalist Approach to Implementing Server Selection," U.S. Provisional Patent Application No.: 60/177,415, filed Jan. 21, 2000, 39 Pages.

Cable Television Laboratories, Inc., Interim Specification, "Data–Over–Cable Service Interface Specifications, Radio Frequency Interface Specification, SP–RFIv1.1–102–990731," Jul. 30, 1999, 352 Pages.

Norman W. Finn et al., "Port Aggregation Protocol", U.S. Appl. No. 08/902,638 filed Jul. 30, 1997.

Eager et al., "Adaptive Load Sharing in Homogeneous Distributed Systems", IEEE' Transactions on Software Engineering, vol. SE–12, No. 5, May 1986.

Mockapetris, P., Request For Comments No. 1034, entitled, "Domain Names—Concepts and Facilities," Nov., 1987, Internet Engineering Task Force, 31 pages.

Information Sciences Institute, Request for Comments No. 793, entitled, "Transmission Control Protocol—DARPA Internet Program—Protocol Specification," Sep., 1981, Internet Engineering Task Force, 49 pages.

David M. Gifford, "Replica Routing," U.S. Appl. No. 09/472,964, filed Dec. 28, 1999, 37 Pages.

* cited by examiner

PORT AGGREGATION LOAD BALANCING

CROSS REFERENCE TO RELATED APPLICATIONS

This application is a continuation of application Ser. No. 10/251,605, filed Sep. 19, 2002 now U.S. Pat. No. 6,667,975 entitled "PORT AGGREGATION LOAD BALANCING" in the name of DeJager et al., which is a continuation of application Ser. No. 09/204,658, filed Dec. 2, 1998, now U.S. Pat. No. 6,473,424, entitled "PORT AGGREGATION LOAD BALANCING" in the name of DeJager et al. applications Ser. Nos. 09/204,658, and 10/251,605 are incorporated herein by reference in their entirety for all purposes.

BACKGROUND OF THE INVENTION

The present invention relates generally to computer networking. More specifically, the present invention relates to methods and apparatuses for distributing frame transmissions as evenly as possible across a group of ports which are logically grouped into a single port.

A common computer network implementation includes a plurality of clients, such as personal computers or work stations, connected to each other and one or more servers via a switch or router by network cable. In the present application, the term "switch" is intended to mean any network device that forwards packets from a source to a destination, rather than broadcasting them (i.e., includes router, but excludes repeater). The network is configured to operate at one or more data transmission rates, typically 10 Mbit/sec (e.g., 10Base-T Ethernet), or 100 Mbit/sec (e.g., 100Base-T Fast Ethernet). More recently, Gigabit data transmission rates have become attainable. Data is forwarded on the network in packets which are typically received by a switch from a source network device and then directed to the appropriate destination device. The receipt and transmission of data packets by a switch occurs via ports on the switch Packets travelling from the same source to the same destination are defined as members of the same stream.

Since network switches typically receive data from and transmit data to several network devices, and the cable connections between the various network devices typically transmit data at the same rate, a bottle-neck may be created when, for example, several devices (e.g., clients) are simultaneously attempting to send data to a single other device (e.g., a server). In this situation, the data packets must sit in a queue at the port for the server and wait for their turn to be forwarded from the switch to the server.

One way to relieve this bottle-neck is to provide a logical grouping of multiple ports into a single port. The bandwidth of the new port is increased since it has multiple lines (cables) connecting a switch and another network device, each line capable of carrying data at the same rate as the line connecting data sources to the switch. This grouping of ports is sometimes referred to as a port aggregation or port group. One example of such a port aggregation implementation is Cisco Technology, Inc.'s Fast EtherChannel™ port group in a Fast Ethernet network. Further information regarding Fast EtherChannel™ may be found on Cisco Technology, Inc.'s World Wide Web site www.cisco.com. This information is incorporated by reference herein for all purposes.

In order for networking equipment to make optimal utilization of the increased bandwidth provided by a port group, packet transmissions must be distributed as evenly as possible across the ports of the group. In addition, a suitable distribution system will ensure that packets in the same stream are not forwarded out of order.

Traffic distribution for ports grouped in port groups has conventionally been accomplished by static distribution of addresses across the ports of a group. In one example of such a static distribution of network traffic, as a packet of data to be forwarded is received by a switch, its destination address is determined, and it is assigned to the port group connecting with its destination. Assignment to a port within the port group may be done in a number of ways. For example, each packet assigned to the port group may be assigned to the next port in a cycle through the ports, or the assignment may be based on the packet's source address. However it is done, this assignment is permanent, so that if a second packet with the same address is subsequently received by the switch, it is assigned to the same port assigned to the previous packet with that address. The one exception to this permanent assignment in conventional systems may be the removal of an address due to aging, that is, if a long enough period of time (e.g., 10 to 1,000,000 seconds, typically 300 seconds) passes between the receipt of two packets of data having the same address, the second packet may be assigned to a different port. Another static address distribution system performs a simple logical operation on a packet's source and destination addresses (exclusive OR of the two least significant bits of the addresses) in order to identify the port within a group to be used to transmit a packet.

Static address distribution systems ensure that packets from a given stream are not forwarded out of order by permanently assigning the stream to a particular port. In this way, packets in a stream can never be forwarded to their destination by the switch out of order. For example, an earlier packet in the stream may not be forwarded by the switch before a later one via a different less-busy port in the group since all packets from that stream will always be forwarded on the same port in the group.

While static address distribution improves the efficiency of data transmission over a port group by distributing packet streams among the various ports of a port group, it does not account for the amount of traffic volume of different streams. Accordingly, static address distribution evenly (and thus most efficiently) distributes traffic over the ports of a port group of a switch only if there is the same amount of data being forwarded in each stream. If a given stream is transmitting much more than the average amount of data for streams being forwarded through the port group, then there may be inefficiencies in the data transmission in a static address distribution system. For example, this situation may result in there being a long queue for the port to which the heavily loaded stream is assigned, while other ports in the group, which are assigned to more lightly loaded streams, are available to transmit data.

Accordingly, what is needed is an improved distribution system for network port groups that satisfies the port groups' distribution and packet ordering requirements, while taking into consideration the amount of data being forwarded in a given stream.

SUMMARY OF THE INVENTION

The present invention meets this need by providing methods, apparatuses and systems for balancing the load of data transmissions through a port aggregation. The methods, apparatuses and systems of the present invention allocate port assignments based on load, that is, the amount of data being forwarded through each port in the group. The load balancing of the present invention is preferably dynamic, that is, packets from a given stream may be forwarded on different ports depending upon each port's current utilization. When a new port is selected to transmit a particular packet stream, it is done so that the packets cannot be forwarded out of order. This is preferably accomplished by ensuring passage of a period of time sufficient to allow all packets of a given stream to be forwarded by a port before a different port is allocated to transmit packets of the same stream. The invention may be used in a variety of different network environments and speeds, including 10Base-T, 100Base-T, and Gigabit Ethernet, and other network environments.

In one aspect, the present invention provides a method of distributing traffic over a network port group. The method involves receiving a packet of data to be forwarded, determining a stream ID for the packet, and determining whether a prior packet having that stream ID has been distributed to a queue on a port in the group during a predetermined time interval. Where a prior packet having that stream ID has not been distributed to a queue on a port of the group during the predetermined time interval, the method involves allocating the packet to a queue of a port having a lesser load in its queue than a queue of any other port of the group. The method may also involve, where a prior packet having that stream ID has been distributed to a queue on a port of the group during the predetermined time interval, allocating the packet to that queue. In addition, the method may involve monitoring the port group queues to maintain proper identification of the least utilized queue.

In another aspect, the invention provides a network switch. The switch includes a port group and a system for distributing network traffic among ports of the port group. The system includes a mechanism for determining a stream ID for the packet and assigning the packet having the stream ID to a queue of a port in the port group, and a mechanism for adjusting a queue assignment of a prior packet having the stream ID to a queue of a different port of the port group based on load in the queues of the ports of the group. The mechanism for determining a stream ID and assigning the packet having the stream ID to a queue of a port in the port group may include a hashing and masking mechanism for determining a stream ID for the packet, a pair of time mark registers for determining whether another packet having the stream ID has been distributed to a queue for a port in the group during a time interval, and a stream state table for storing stream IDs with corresponding queue assignments. The adjusting mechanism may include a least utilized queue register for maintaining proper identification of a least utilized queue, and a pair of queue mark registers for determining whether a queue for a port in the port group is current. In addition, the switch may include a clock for timing a load balance time interval.

In a further aspect, the invention provides a computer program product including a computer-usable medium having computer-readable program code embodied thereon relating to updating current and alternate time mark registers for a dynamic load balancing of traffic on a port aggregation, the computer program product having computer-readable program code for effecting the following steps within a computing system: Determining whether a load balance time interval has passed; where the load balance time interval has passed, determining for each queue of the port group, whether a queue mark indicate bit assigned to packets exiting the queue is equal to a queue mark bit being assigned to packets entering the queue; where the queue mark indicate bit is the same as the queue mark bit, clearing all alternate time mark register bits, and toggling (i.e., changing from 0/1 or vice versa) all queue mark bits; and, switching the current and alternate time mark registers.

These and other features and advantages of the present invention will be presented in more detail in the following specification of the invention and the accompanying figures which illustrate by way of example the principles of the invention.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Introduction

The present invention provides methods, apparatuses and systems for balancing the load of data transmissions through a port aggregation. The methods and apparatuses of the present invention allocate port assignments based on load, that is, the amount of data being forwarded through each port in the group. The load balancing of the present invention is preferably dynamic, that is, packets from a given stream may be forwarded on different ports depending upon each port's current utilization. When a new port is selected to transmit a particular packet stream, it is done so that the packets cannot be forwarded out of order. This is preferably accomplished by ensuring passage of a period of time sufficient to allow all packets of a given stream to be forwarded by a port before a different port is allocated to transmit packets of the same stream. The invention may be used in a variety of different network environments and speeds, including 10Base-T, 100Base-T, and Gigabit Ethernet, and other network environments.

Figure 1:
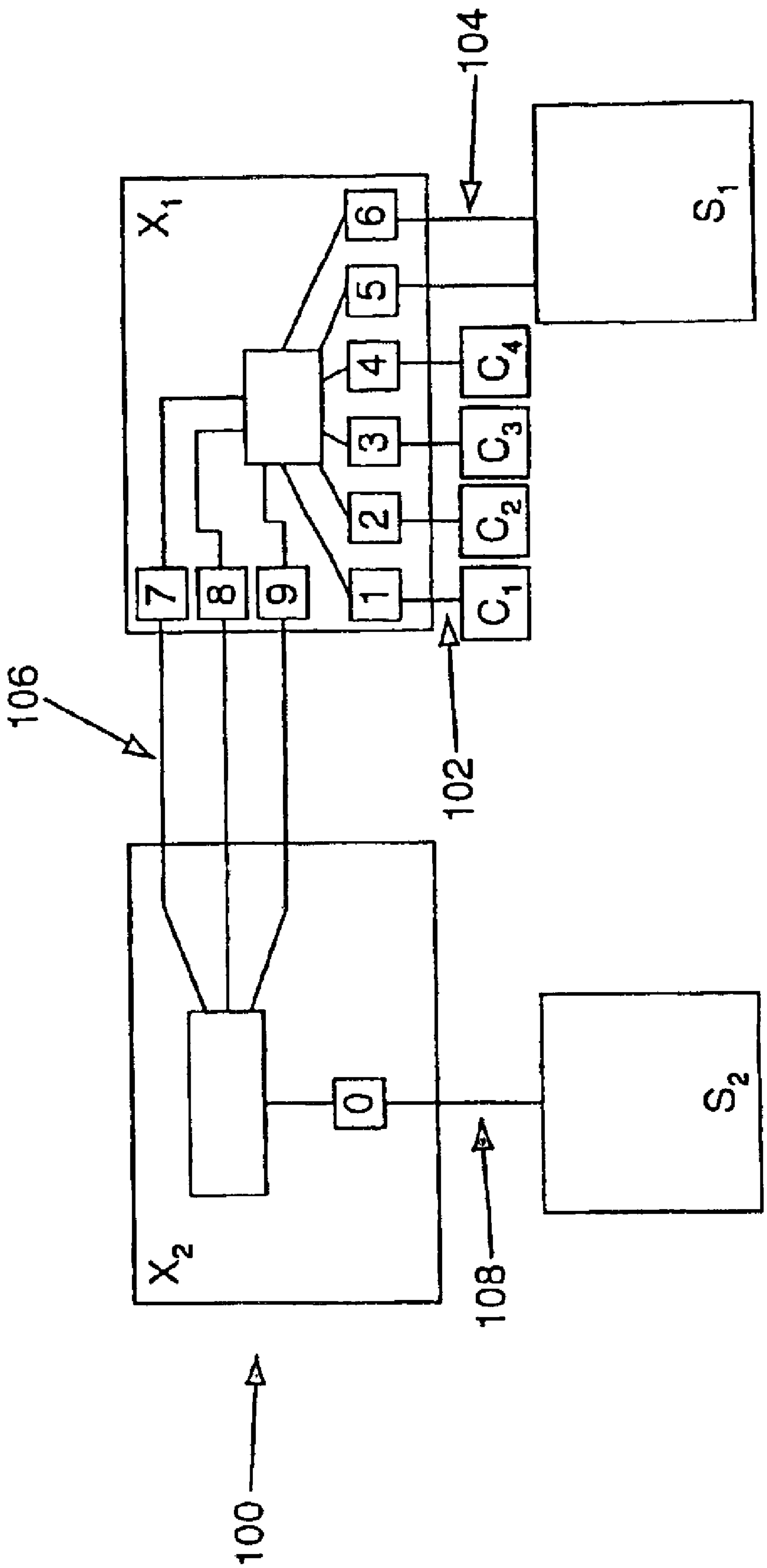
FIG. 1 depicts a block diagram illustrating a simple network.

FIG. 1 illustrates a block diagram of a simple network. The network 100 includes two servers $S_1$ and $S_2$, respectively, and two switches, $X_1$ and $X_2$, respectively, as well as four clients $C_1$, $C_2$, $C_3$ and $C_4$, respectively. Clients $C_1$, $C_2$, $C_3$ and $C_4$ are connected to switch $X_1$ by, for example, Fast Ethernet links 102 via ports 1, 2, 3 and 4, respectively. Server $S_1$ is connected to switch $X_1$ via a port aggregation 104, which is a port group composed of ports 5 and 6 of switch $X_1$. Switch $X_1$ is connected to switch $X_2$ via a second port aggregation 106 which includes ports 7, 8 and 9. Switch $X_2$ is connected to server $S_2$ via port 0 and Fast Ethernet link 108.

A preferred embodiment of the present invention will be described below with reference to an example implementation of the invention on a network system such as that described with reference to FIG. 1. The sample implementation is a dynamic load balancing system in which data traffic is periodically distributed across the ports in a group based on transmit queue depth. A transmit queue (in this embodiment, there is only one queue per port) is a queue of packets to be forwarded on any given port. A dynamic load balancing system in accordance with the present invention prevents packets from being forwarded out of order, and minimizes the likelihood that receive buffering in a downstream switch or router will cause packets to be received out of order.

Stream State Tables

The sample implementation begins when a packet of data is received by a switch, for example switch $X_1$, from a source, for example client $C_1$, for transmission to a destination, for example server $S_2$. A packet's stream may be identified by the packet's source and destination address together, or by the source or destination addresses independently. This option is preferably configurable in systems in accordance with the present invention. The stream identification is used to index a stream state table. While this embodiment of the present invention references only Ethernet (layer 2) addresses, packets may also be identified by layer 3 or higher addresses in other embodiments.

Figure 2:
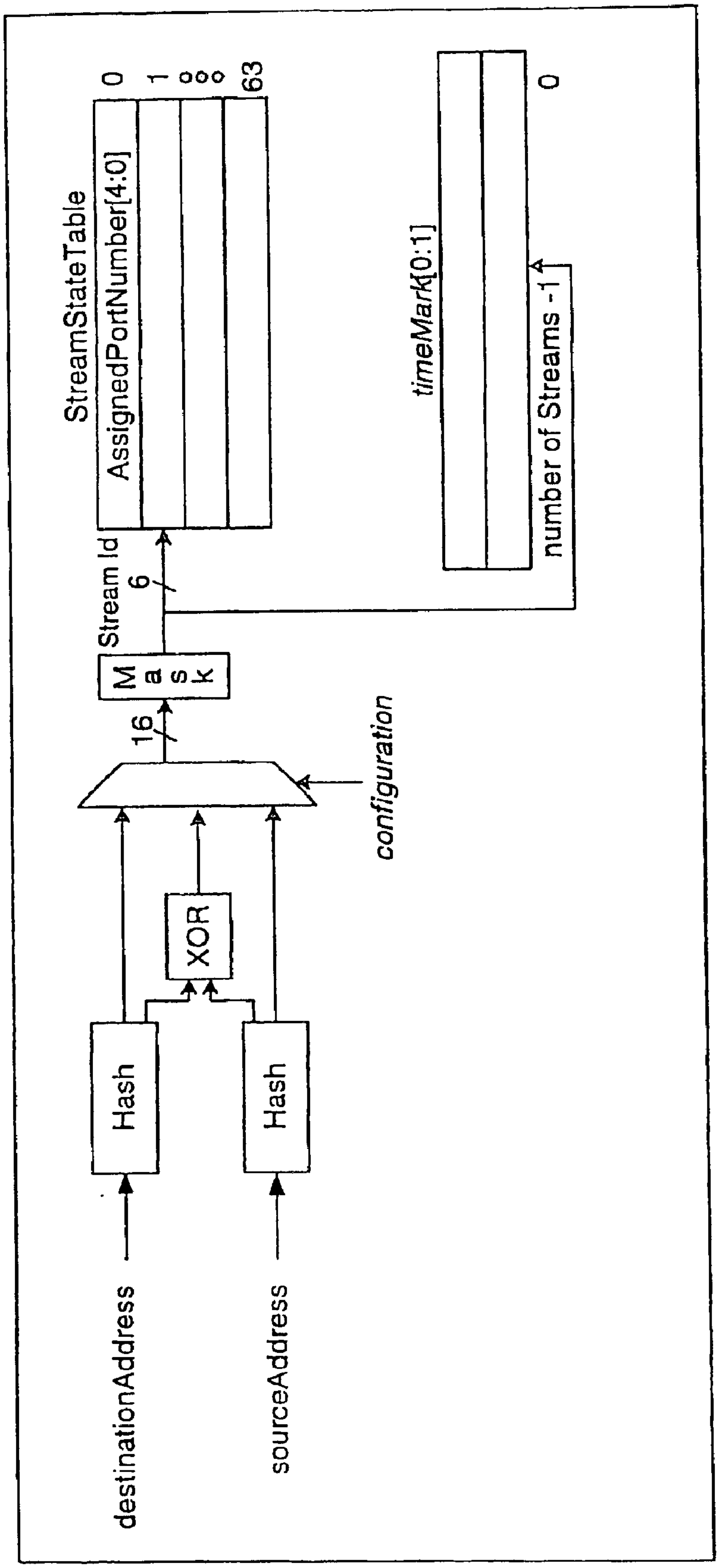
FIG. 2 illustrates a process and system for hashing and masking packet addresses to determine stream ID's for loading into stream state tables, in accordance with a preferred embodiment of the present invention.

Ethernet addresses have 48 bits. Therefore, the number of possible streams identified by such an address may be $2^{48}$ or, where the stream address is defined by both the source and the destination address, $2^{96}$. In order to reduce the number of possible stream addresses and thereby permit a more economical system, both addresses may be hashed and then either an XOR (exclusive OR logical operation) of the two hashes or one of the hashes independently may masked down to a n-bit index, where n is much less than 96, for example 6, as shown in FIG. 2. Conventional hashing and masking techniques and mechanisms known to those of skill in the art may be used. This results in a table depth of 64 ($2^6$).

Hash collisions are possible with this indexing methodology and collisions result in imprecise load distribution decisions. The consequence of a hash collision is that an opportunity to redistribute a stream to another port may be missed. For example, if two streams hash to the same value, before either can be assigned to a new port by load distribution, both streams must have cleared the system. While this hashing makes the system less robust than an idealized system, it achieves advantages in chip size and cost by dramatically reducing the number of stream state values from $2^{96}$ to 64.

Once it has been hashed and masked, the 6-bit stream identification (stream ID) is used to address the stream state table. This table stores the port number currently assigned to a stream.

Time Mark Indication

The system also includes a pair of alternating time-mark registers to assist in determining if any packets of a given stream have been encountered in a given time interval, preferably in the ms to Φs time range. This information is used in decisions to move a packet stream from one port to another in a port group. To avoid any possibility of packets being received out of order by a downstream device, this mechanism ensures that there has been at least some period of time since the last was forwarded.

The two alternating time-mark registers are defined to enable the system to keep track of not only the current time interval, but also to maintain a running history of the previous time interval. A pair of time-mark registers are defined for each port group. Each time-mark register is as wide as the total number of identifiable streams (64 in a 6-bit embodiment).

In accordance with the preferred embodiment of the present invention, at any given time a bit, which may be called the time-mark select bit, indicates the current time-mark register to use (0/1). According to this embodiment, as each packet is processed, its stream ID is calculated as shown above and the bit in the current time-mark register corresponding to that stream is set. Periodically, software switches the pointer to use the other time-mark register, clearing that register first. At this point, the two time-mark registers reverse roles: the current time-mark register becomes the alternate time-mark register, and what was the alternate time-mark register becomes the current time-mark register. Thus, if the bit corresponding to a particular stream ID is set in the current time-mark register, one or more packets of that stream have been encountered in the current time interval; and if that bit in the alternate time-mark register is set, one or more packets of that stream were encountered in the previous time interval. The significance of these features for load balancing in accordance with the present invention will be further explained below in conjunction with additional features of this embodiment of the invention.

Queue Mark Indication

Another feature of a preferred load balancing system in accordance with the present invention is a queue mark indicator. This mechanism provides a way of determining if a transmit queue is current, that is, that the packets entering the queue (pushed) during a given time interval are the same ones that are exiting the queue (popped). This piece of information may be used in conjunction with the time-mark registers, described above, to determine when a stream may change queues without risking packets being received out of order by the downstream destination device. In a preferred embodiment, a queue mark indicator mechanism may be implemented with two software-accessible hardware registers: a transmit queue mark register and a transmit queue mark indicate register, as follows.

The bits in the transmit queue mark register provide a mark bit for each transmit queue—analogous to a time stamp. Each time an entry (packet) is pushed onto a transmit queue, the mark bit field of the register is pushed along with it. Each time an entry is popped off a queue (i.e., forwarded), the mark bit field is popped along with it. This popped-off bit value is written to a transmit queue mark indicate register which contains an indication bit for each queue. By comparing the values of the mark bit and the indication bit for a given queue, software can determine, on a queue by queue basis, if that queue is current since the mark bit was last changed.

For example, for a given queue, software may change the transmit queue mark bit from a zero to a one. Prior to that instant, all pushes had their mark bit fields set to zero. But all subsequent pushes will have their mark bit fields set to a one. As each of the old entries is popped off the queue, the mark bit field reads zero, so the transmit queue mark indicate bit is set to zero with each of these pops. As soon as the first new entry is popped off the queue, the transmit queue mark indicate bit will be set to one, matching the value in transmit queue mark register.

At this point, software may change the transmit queue mark bit from a one back to a zero, and the process is repeated. As each of the old entries is popped off the queue, the mark bit field reads one, so the transmit queue mark indicate bit is set to one with each of these pops. As soon as the first new entry is popped off the queue, the transmit queue mark indicate bit will be set to zero, matching the value in transmit queue mark register.

A special condition exists if no pushes occur after a transmit queue mark bit is changed. In this case there are also no pops with the new mark bit, so the transmit queue mark indicate bit cannot be set correctly. If this condition exists, the transmit queue will eventually become empty (if it isn't already). At that time hardware may detect this case, and explicitly set the indicate bit to the value of the mark bit.

To summarize, a queue is considered current if the indicate bit (that being popped off the queue) equals the mark bit (that being pushed onto the queue) or if the queue is empty.

Least Utilized Queue

In order for load balancing across the ports of a port group to occur, each group preferably continuously keeps track of its least utilized transmit queue, that is, the queue having the least amount of packet volume in its queue. In order to simplify an actual hardware implementation, the indication may not be precise at any given instant; however, over time, it corrects itself, for example as described below.

The mechanism of this embodiment uses one register per port group that indicates the queue number that it believes is the least utilized queue (least utilized queue register). In addition, every queue includes a register that indicates the number of entries it contains (transmit queue depth register).

Whenever an element is pushed onto a transmit queue, the least utilized queue process for each port group compares the queue number with the least utilized queue register. If the numbers are different, it ignores the push event. If, however, the numbers are the same, it checks transmit queue depth register for that queue. If the transmit queue depth register is zero, the process does nothing. If the transmit queue depth register is non-zero, it checks to see if any other queues in the port group have no entries. If so, then it selects the next queue, from those with no entries, to be the new "least utilized queue." If all of the other queues have entries, the process does nothing.

Whenever an element is popped from a transmit queue, the process for each port group compares the queue number with the queue numbers in the port group. If there is a match, then the queue is a member of that port group. If the number of entries on this queue is less than the number of entries on the least utilized queue for that port group, then this queue becomes the new "least utilized queue." If the number of entries on this queue is not less than the number of entries on the least utilized queue for that port group, then the process does nothing.

To summarize, for each port group, a process monitors transmit queue pushes and pops to determine the least utilized queue.

Load Balancing

Figure 3A:
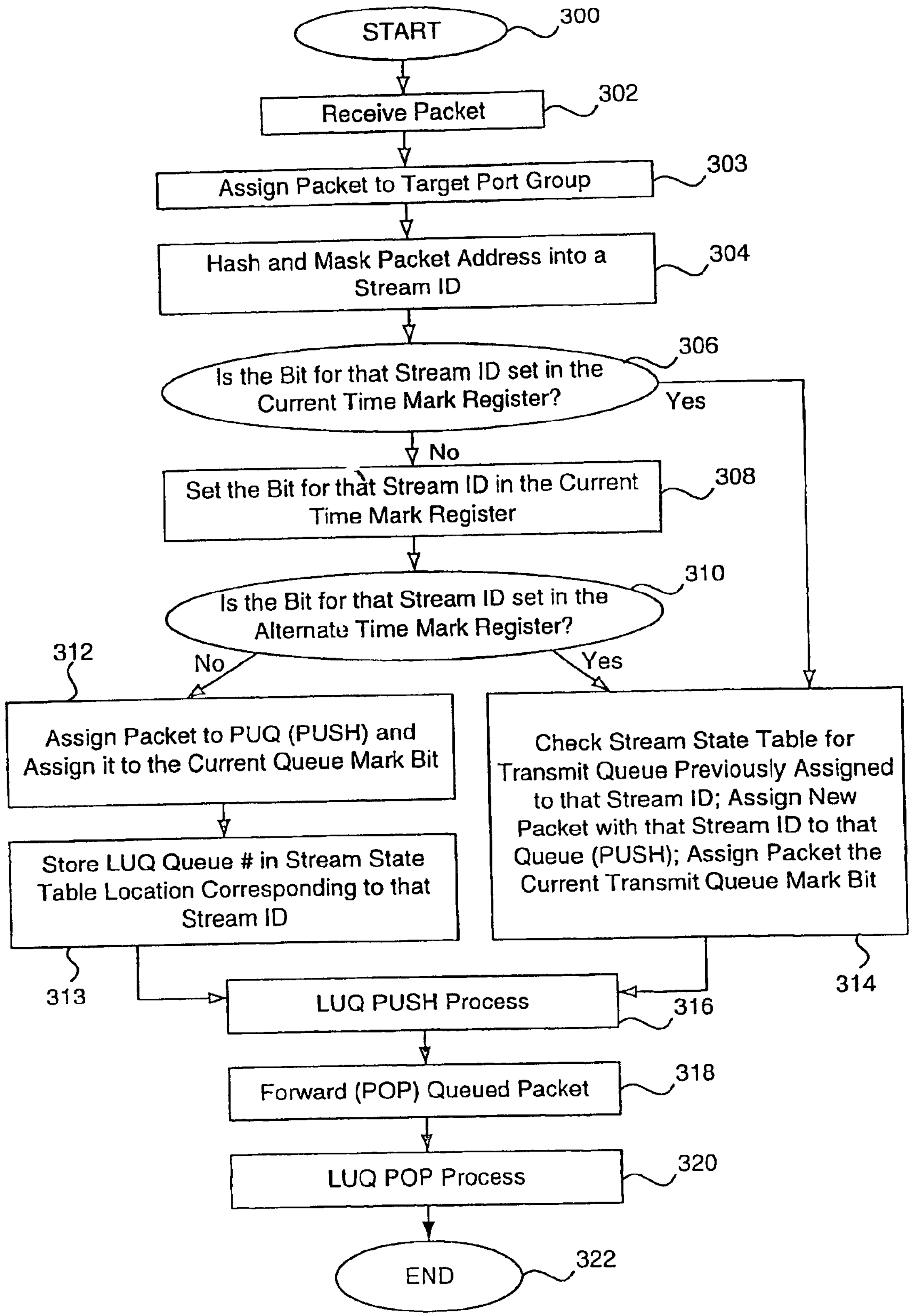
FIGS. 3A and 3B illustrate flow charts of processes of dynamic load balancing in accordance with preferred embodiments of the present invention.
Figure 3B:
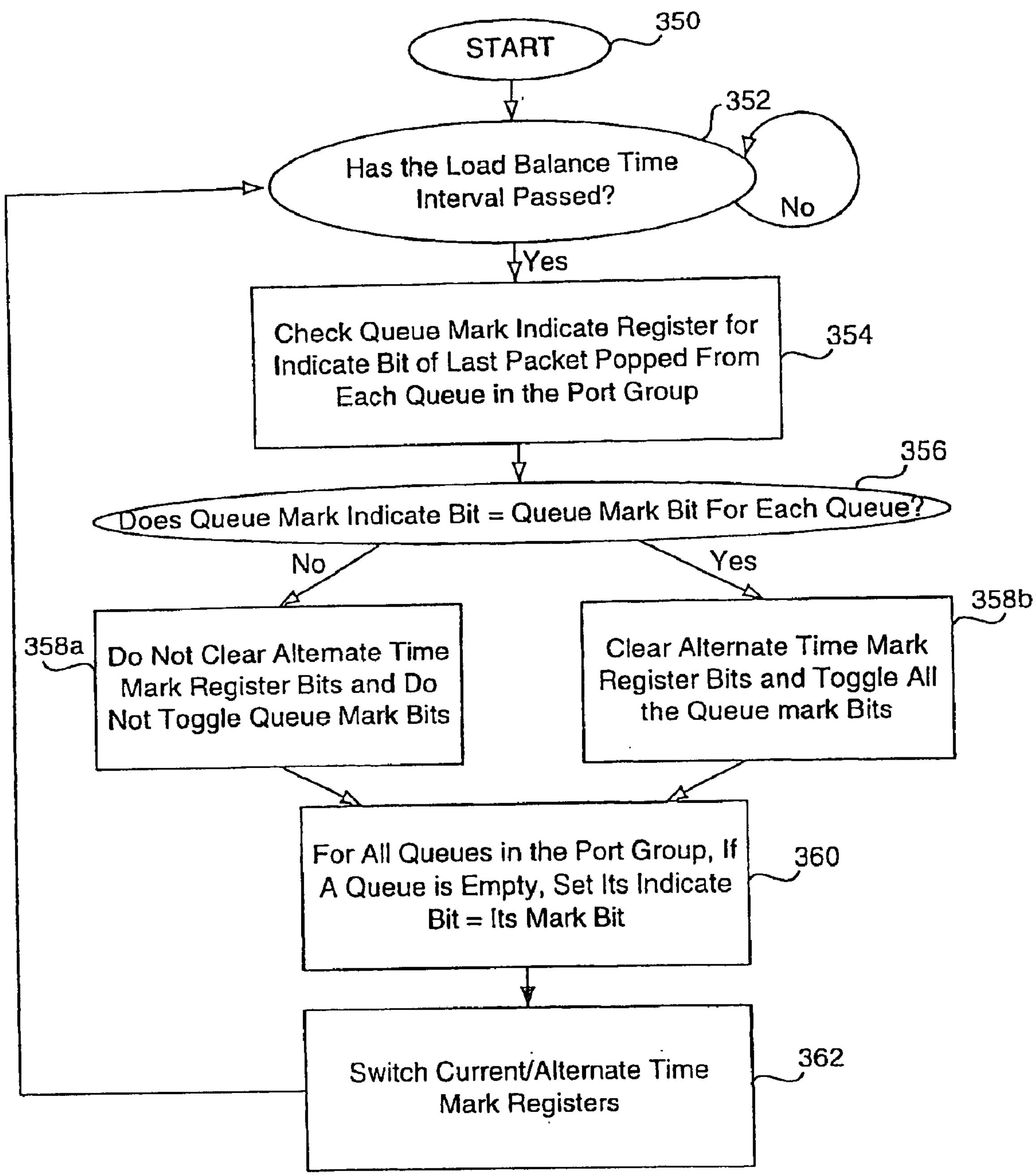

Load balancing in accordance with a preferred embodiment of the present invention may be achieved by coordination of the features described above. FIGS. 3A and 3B illustrate flow charts for aspects of processes of dynamic load balancing in accordance with a preferred embodiment of the present invention. The invention is preferably implemented on a network system such as that described below with reference to FIG. 4. As an initial matter, a system in accordance with the present invention will preferably set-up and configure its port groups, clear both time registers, select one time mark register as the current time mark register and the other as the alternate time mark register, and set the queue mark and queue mark indicate registers for each port to different values.

FIG. 3A is primarily addressed to the basic load balancing feature of the present invention, that is, assignment of packets to ports in a port aggregation based on traffic volume. The process begins at a step 300, and at a step 302 a packet of data is received for forwarding. At a step 303 the packet's address is analyzed to determine the packet's target port group. At a step 304, the packet's address is hashed and masked into a 6-bit stream ID. Next, in a decision step 306, a determination is made whether or not the bit for that stream ID is set in the current time mark register. If decision step 306 is answered in the negative, the bit for that stream ID is set in the current time mark register, at a step 308. If decision step 306 is answered in the affirmative, the stream state table is checked for the transmit queue to which the packets from the stream corresponding to that stream ID have previously been assigned, and the new packet having the same stream ID is assigned to (pushed onto) that transmit queue, at a step 314. The newly queued packet is also assigned the current transmit queue mark bit.

When the decision step 306 is answered in the negative and the process proceeds to step 308 where the bit is set for that stream ID in the current time mark register, the next step in the process is to check to see if the bit corresponding to that stream ID is set in the alternate time mark register, at a step 310. If decision step 310 is answered in the affirmative, the process proceeds to step 314, described previously. If, however, decision step 310 is answered in the negative, the new packet with that stream ID is assigned to the least utilized queue (LUQ) in the switch's port group and is assigned the current transmit queue mark bit, at a step 312. At a step 313, the queue number of the LUQ is stored in the stream state table location corresponding to that stream ID.

Following either steps 313 or 314, the least utilized queue push process, described above, may be implemented to update the LUQ, at a step 316. At a step 318 a packet previously pushed onto a port's queue may be forwarded (popped) from the queue. Then, at a step 320, the least utilized queue pop process, described above, may be implemented to update the LUQ. The process of FIG. 3A is followed for each new packet received for forwarding, and ends at 322.

The process of FIG. 3B is primarily addressed to the dynamic load balancing feature of the present invention, that is, assignment and reassignment of packet streams to ports in a port aggregation based on the volume of different streams and stream activity. FIG. 3B begins at 350, and at a step 352, the system determines whether or not a time interval, which may be referred to as the load balance time interval, has passed. The load balance time interval is preferably determined to account for any downstream receive buffering capacity, for instance at the port group's convergence point, and may be less than a millisecond in duration. An important function of the load balance time interval is to ensure that packets in a given stream are maintained in the correct order. This is achieved by preventing a stream from switching ports in a port group until sufficient time has passed that all previous packets in the stream forwarded on the first port will be received at the downstream destination device prior to any packets of that stream forwarded on a second port.

If decision step 352 is answered in the affirmative, the transmit queue mark indicate register for each queue in the port group is checked for the status of the indicate bit, at a step 354. Then, the process proceeds to step 356. If decision step 352 is answered in the negative, the process loops back to step 352 again.

At decision step 356, it is determined whether the transmit queue mark indicate bit for each queue in the port group is the same as its current transmit queue mark bit. If decision step 356 is answered in the affirmative, all alternate time mark register bits are cleared, and all queue mark bits are toggled (i.e., changed from 0/1 or vice versa), at a step 358*b*. If decision step 356 is answered in the negative, the alternate time mark register bits and queue mark bits are left alone (not cleared/toggled), at a step 358*a*.

Following process steps 358*a* or 358*b*, at a step 360 the process checks all queues in the port group in order to determine if there are any empty queues. For any empty queues, the queue's queue mark indicate bit is set equal to its queue mark bit. It should be noted that process step 360 may alternatively take place at other points in the process following steps 358*a* or 358*b*, such as following step 362. At step 362, the alternate time mark register becomes the current time mark register while what had been the current time mark register becomes the alternate time mark register. The process of FIG. 3B, which may be implemented as hardware or software, is preferably run simultaneously with the process of FIG. 3A. Following step 362, the process loops back to step 352.

In this way, as each new packet is received for forwarding, it may be forwarded through a switch's port group in the most efficient manner possible according to a dynamic load balancing principle.

Figure 4:
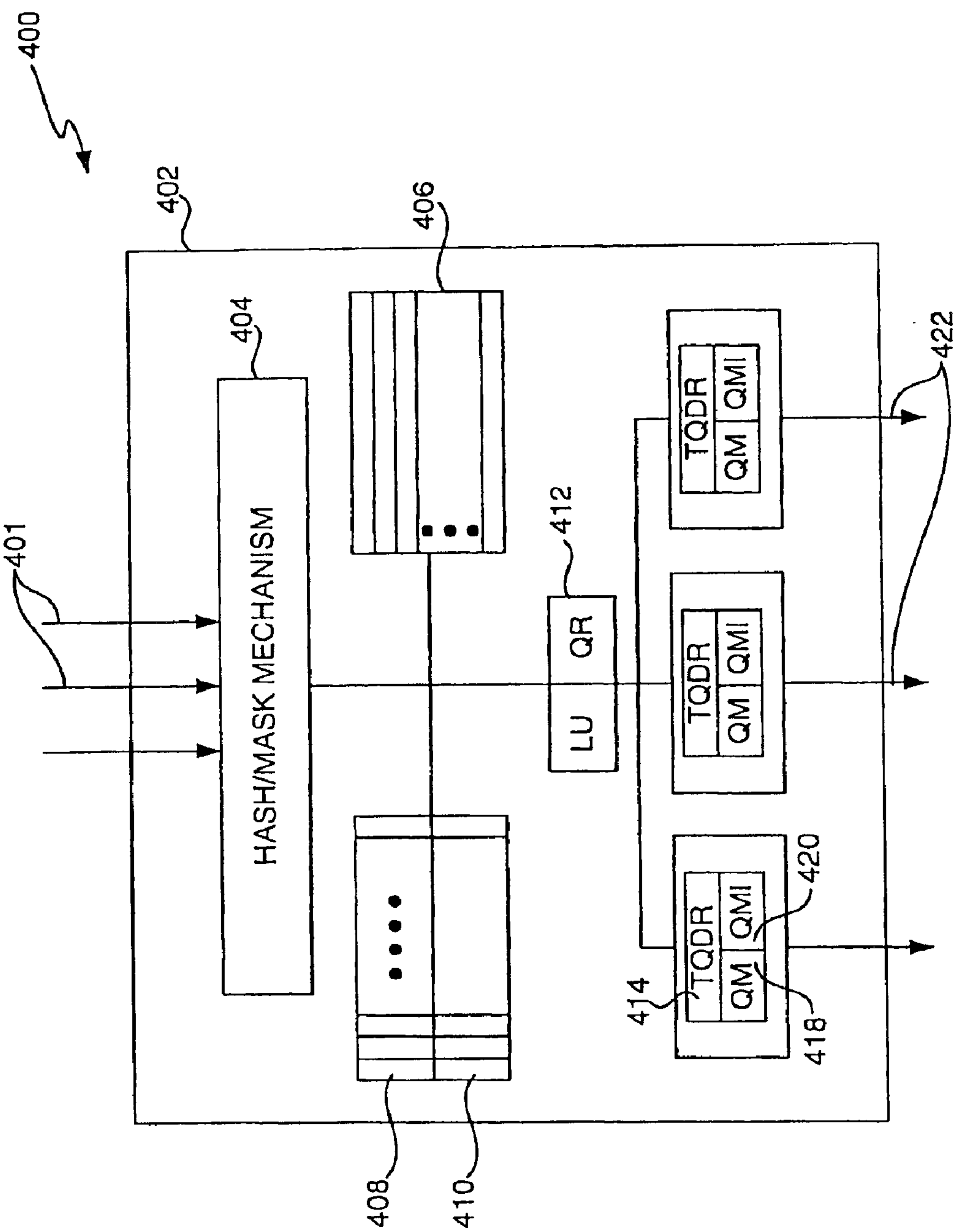
FIG. 4 depicts a block diagram of a system for dynamic load balancing in accordance with a preferred embodiment of the present invention.

FIG. 4 shows a block diagram of a load balancing system in accordance with a preferred embodiment of the present invention. In this embodiment, the system 400 includes a "switch" 402, which may be a switch or other packet-forwarding device as described previously, to which inbound links 401 from sources in the network transmitting packets are connected. The incoming packets pass through a mechanism 404 for hashing and masking packet addresses in order to assign each packet an appropriate stream ID, for example as described previously.

Once a packet's stream ID has been determined, a stream state table 406 and current and alternate time mark registers 408 and 410, respectively, are consulted to determine whether or not a packet in that stream has been forwarded in the current or previous time interval, and the packet is assigned to an appropriate queue for a port in the port group 416 of the switch 400.

The system of this embodiment also preferably includes an additional register per port group that indicates the queue number that it believes is the least utilized queue (least utilized queue register 412). In addition, every queue includes a register that indicates the number of entries it contains (transmit queue depth register 414). These registers may be consulted when packets are pushed onto or popped off a queue in order to keep the LUQ current, for example as described above.

At intervals of time (load balancing time intervals) the time mark registers 408 and 410, respectively, are consulted to determine whether or not a stream may change queues (dynamic load balancing), for example as described previously. Each port in the switch's port group 416 preferably has a pair of queue mark and queue mark indicate registers associated with it in order to assist in determining that a port's queue is current and to determine whether the alternate time mark register should be cleared and the time mark registers switched, for example as described above. Each packet exits the switch through its assigned port in the port group 416 along one of outbound links 422 to its corresponding destination.

CONCLUSION

Therefore, as described herein, the present invention provides a system and process for the allocation of traffic across the ports in a port group of a network switch based on load, rather than based on a static assignment corresponding to the source and/or destination address of the packet. Moreover, the invention preferably provides a process and system for dynamic load balancing of data traffic across the ports of a port group in a network switch which allows packets from the same stream to be forwarded over different ports in the port group without the packets being forwarded out of order. Finally, the present invention also preferably has a time-based element in order to take into account any potential packet misordering due to downstream receive buffering. This time-based feature may be implemented by requiring that a certain period of time (i.e., load balance interval) passes before a packet from a stream forwarded on one port may be forwarded on a second port in the group.

Although the foregoing invention has been described in some detail for purposes of clarity of understanding, it will be apparent that certain changes and modifications may be practiced within the scope of the appended claims. It should be noted that there are many alternative ways of implementing both the process and apparatuses of the present invention. Accordingly, the present embodiments are to be considered as illustrative and not restrictive, and the invention is not to be limited to the details given herein, but may be modified within the scope and equivalents of the appended claims.

What is claimed is:

1. A network switch, comprising:

a port group;

a network traffic distributing system for ports of the port group, including,
a hashing and masking mechanism,
a pair of time mark registers, and
a stream state table; and a queue assignment adjusting mechanism including,
a least utilized queue register, and
a pair of queue mark registers.

2. The network switch of claim 1, wherein the network traffic distributing system is configured to determine a stream ID for a packet and assigning the packet having the stream ID to a queue of a port of the port group, and the queue assignment adjusting mechanism is configured to adjust a queue assignment of a subsequent packet having the stream ID to a queue of the same or a different port of the port group based on load in the queues of the ports of the group and the stream ID of the subsequent packet.

3. The network switch of claim 1, wherein the hashing and masking mechanism is configured to determine a stream ID for the packet;

the pair of time mark registers is configured to determine whether another packet having the stream ID has been distributed to a queue for a port of the group during a time interval; and the stream state table is configured to store stream IDs with corresponding queue assignments.

4. The network switch of claim 1, wherein the least utilized queue register is configured to maintain proper identification of a least utilized queue; and the pair of queue mark registers is configured to determine whether a queue for a port of the port group is current.

5. The network switch of claim 4, further comprising a clock for timing a load balance time interval.

6. The network switch of claim 5, wherein the load balance time interval is less than about 1 millisecond in duration.

7. A computer readable medium on which is provided a computer code for distributing traffic over a network port group, the computer code comprising:

instructions for receiving a packet of data to be forwarded;

instructions for determining a stream ID for the packet;

instructions for determining whether a prior packet having the stream ID has been distributed to a queue for a port of the group during a predetermined time interval; and instructions for, where a prior packet having the stream ID for the packet has not been distributed to a queue of a port in the group during the predetermined time interval, allocating the packet to a queue for a port having a lesser load in its queue than any other port of the group.

8. The computer readable medium of claim 7, further comprising:

instructions for, where a prior packet having the stream ID for the packet has been distributed to a queue for a port of the group during the predetermined time interval, allocating the packet to the queue.

9. The computer readable medium of claim 8, further comprising:

instructions for reallocating the stream ID to a less utilized queue for another port of the port group when a packet having the stream ID has not been distributed to the queue during the predetermined time interval.

10. The computer readable medium of claim 7, further comprising:

instructions for monitoring the port group queues to maintain proper identification of the least utilized queue.

11. The computer readable medium of claim 7, wherein the stream ID determination for the packet comprises hashing and masking an address for the packet.

12. The computer readable medium of claim 11, wherein the hashed and masked address is 6-bits.

13. A computer readable medium on which is provided a computer code for distributing traffic over a network port group, the computer code comprising:

instructions for receiving network traffic at a port group; and instructions for distributing the network traffic among ports of the port group, including, instructions for determining a stream ID for a packet of the network traffic and assigning the packet having the stream ID to a queue of a port of the port group, and instructions for adjusting a queue assignment of a subsequent packet of the network traffic having the stream ID to a queue of a different port of the port group based on load in the queues of the ports of the group.

* * * * *